Dec. 22, 1970     R. R. HOCQ     3,548,446
CONCEALED HINGES
Filed Feb. 20, 1968     10 Sheets-Sheet 1
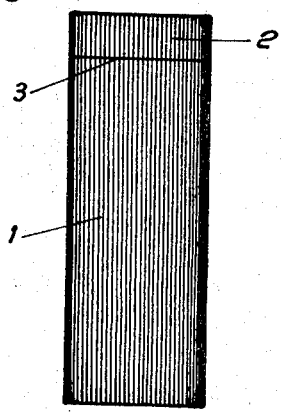
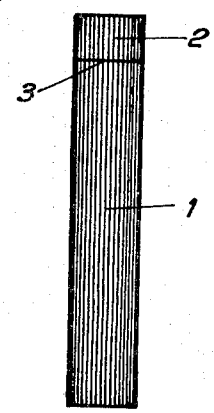
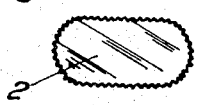
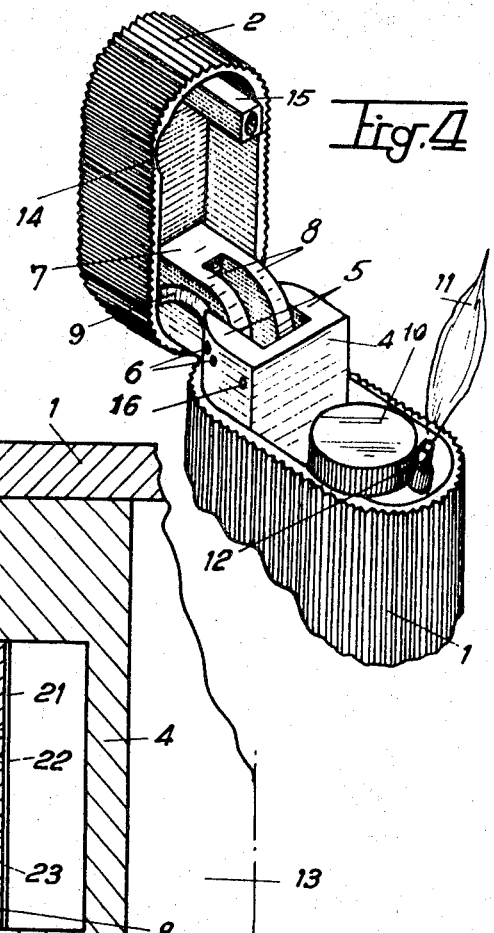
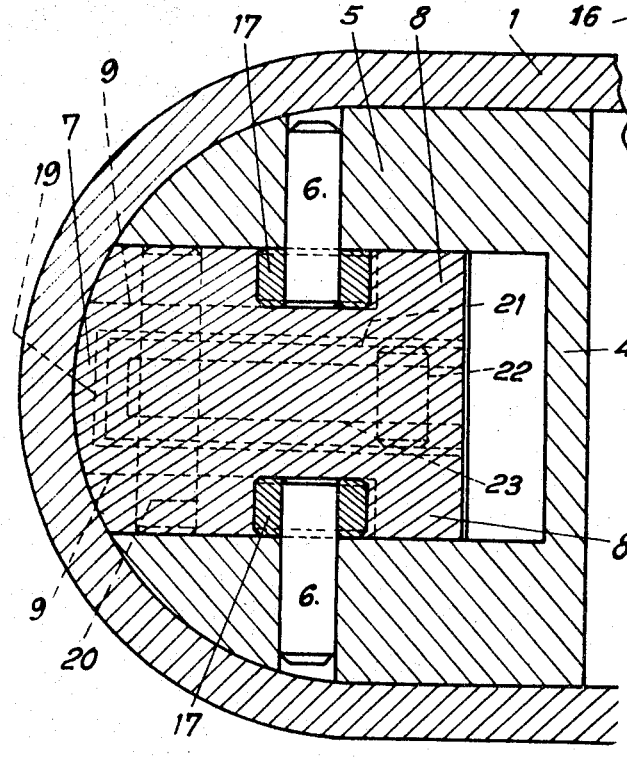
ROBERT RAYMOND HOCQ.
Parmelee, Utzler & Walsh.
his attorney.

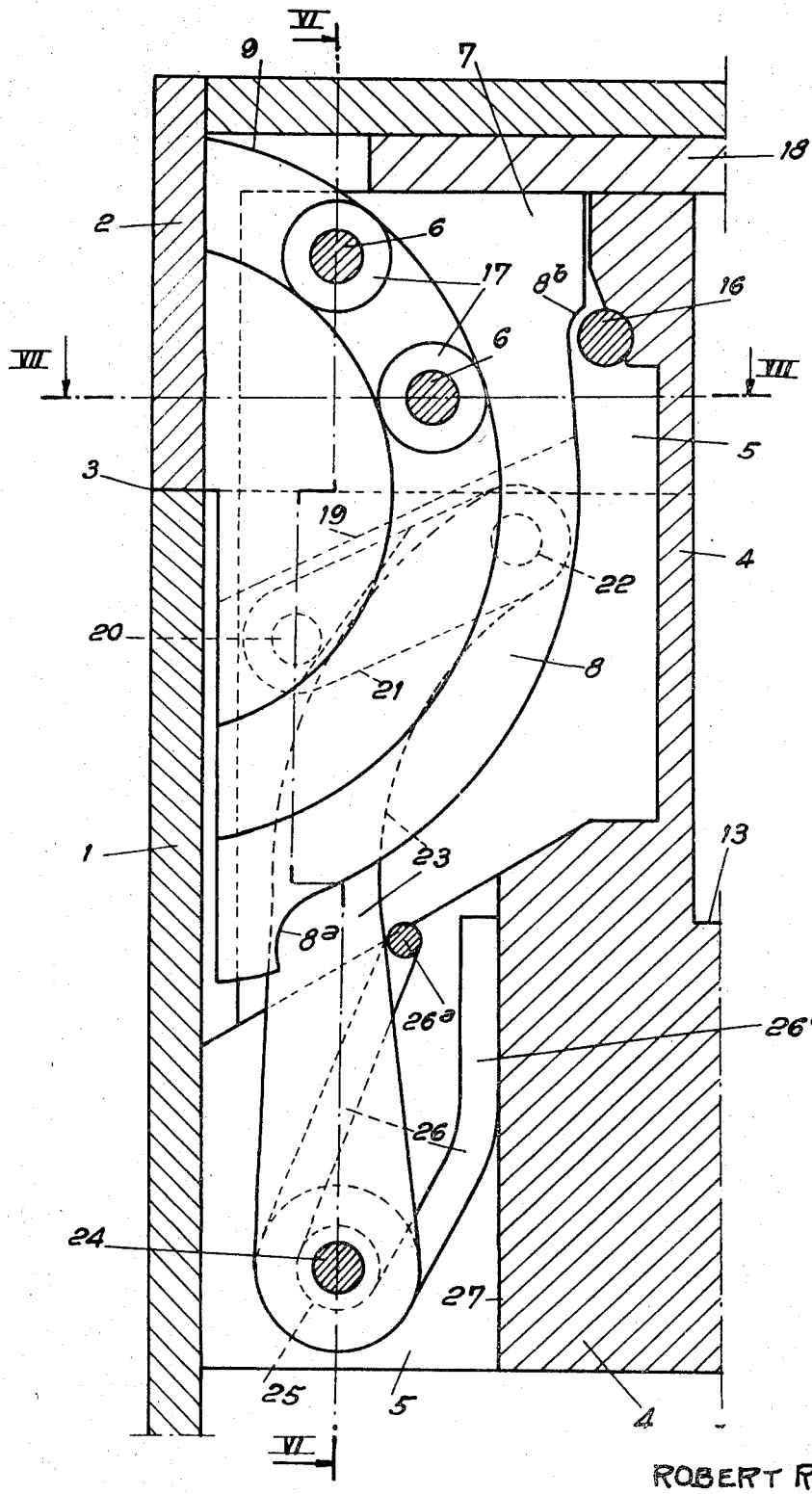

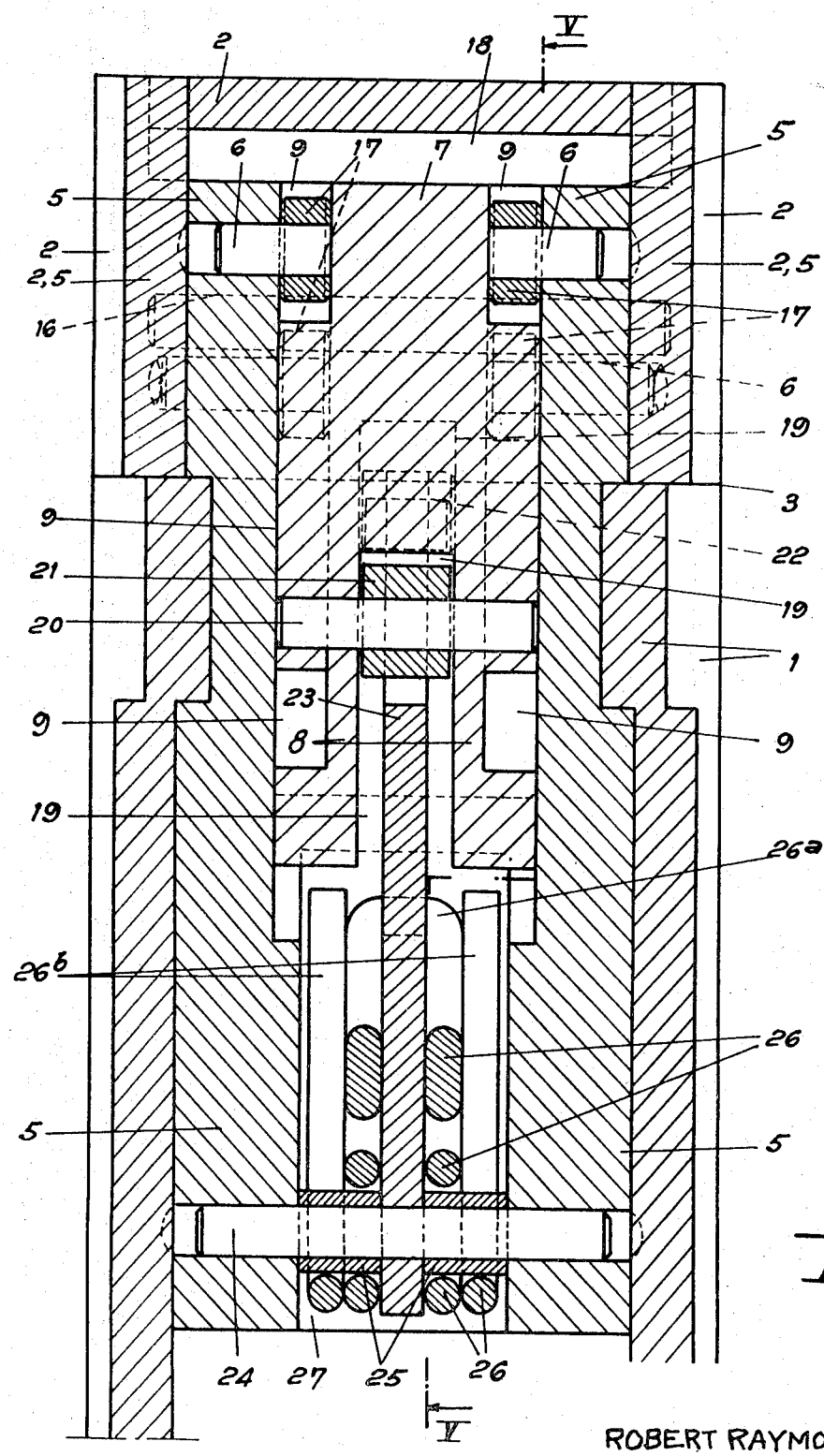

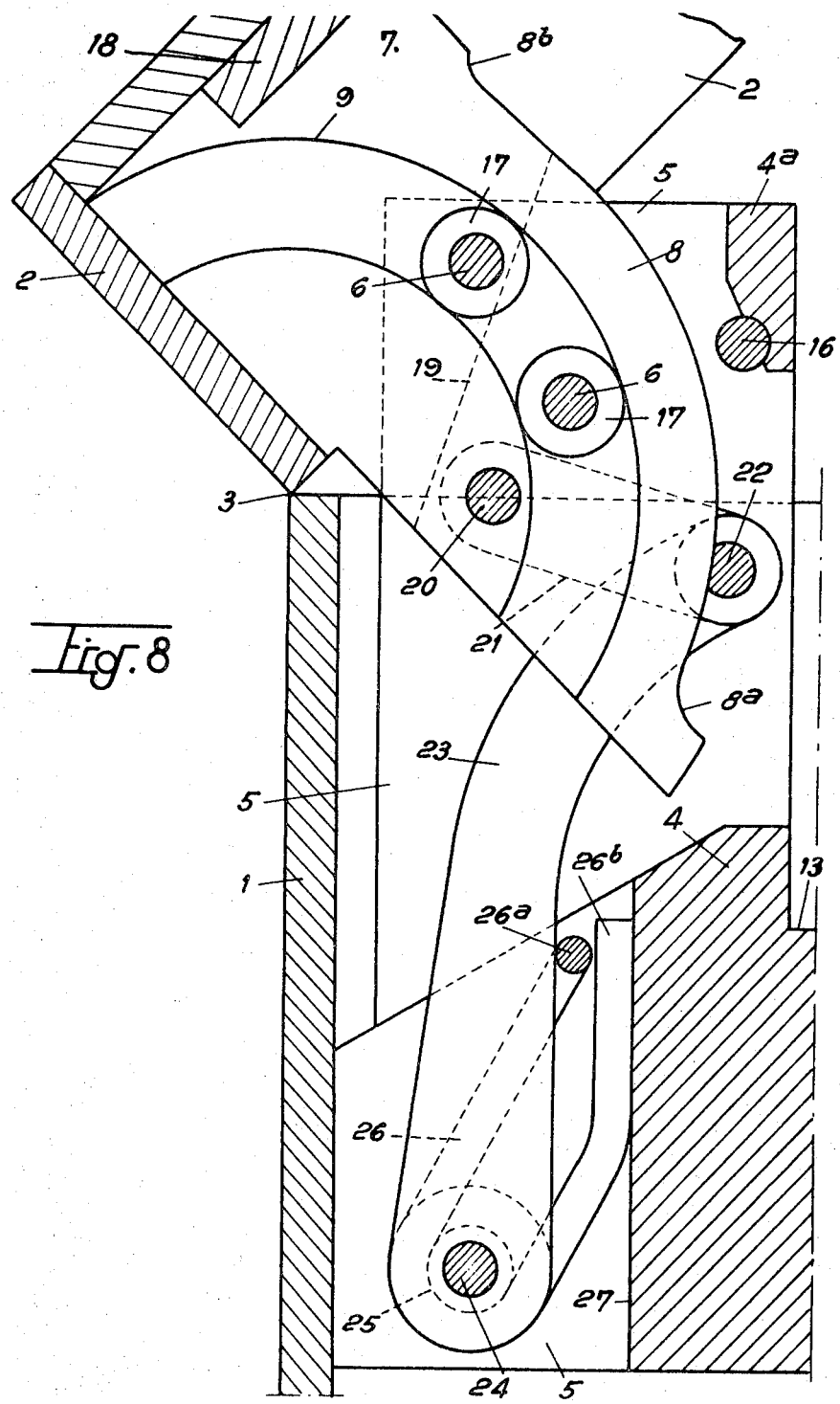

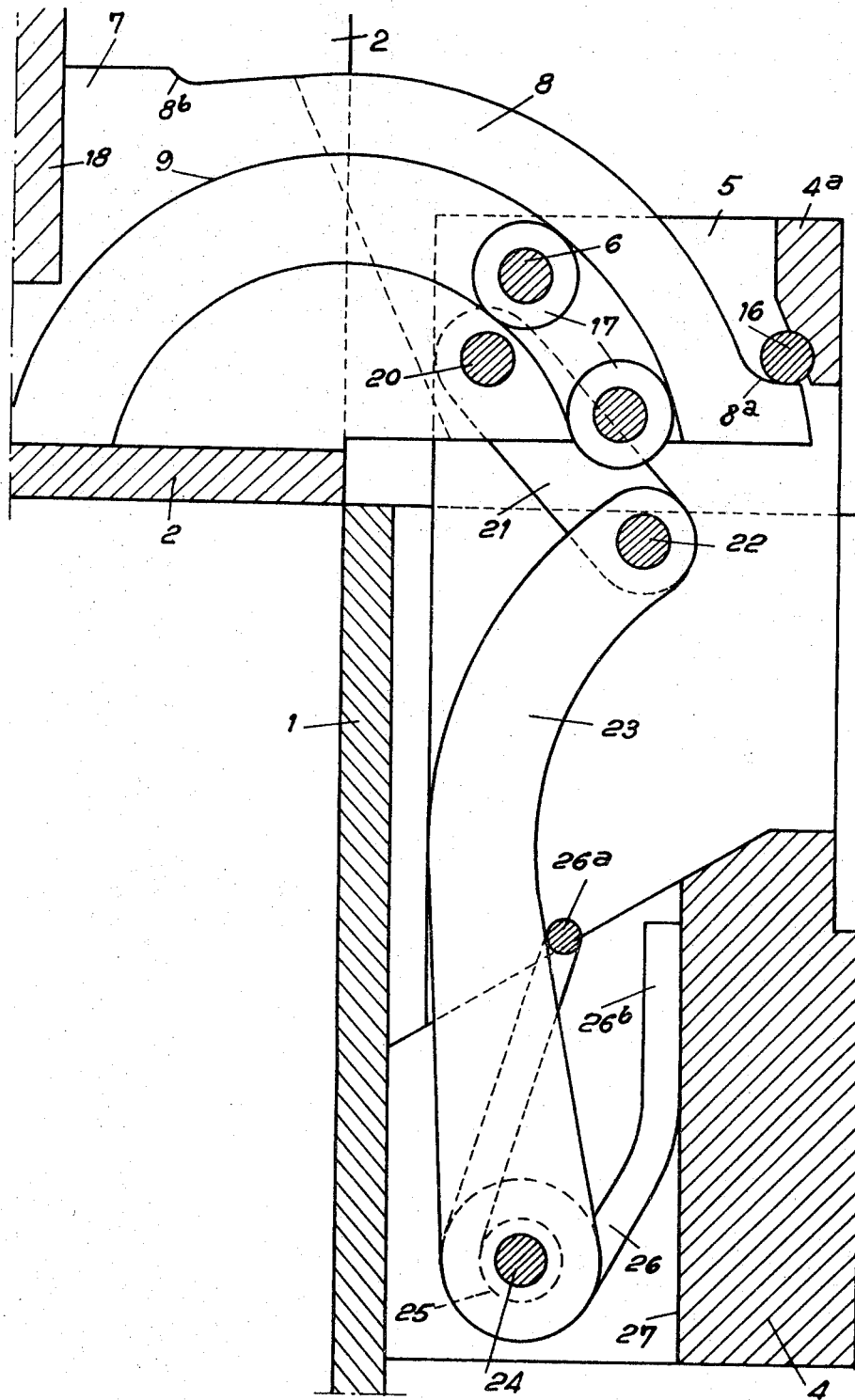

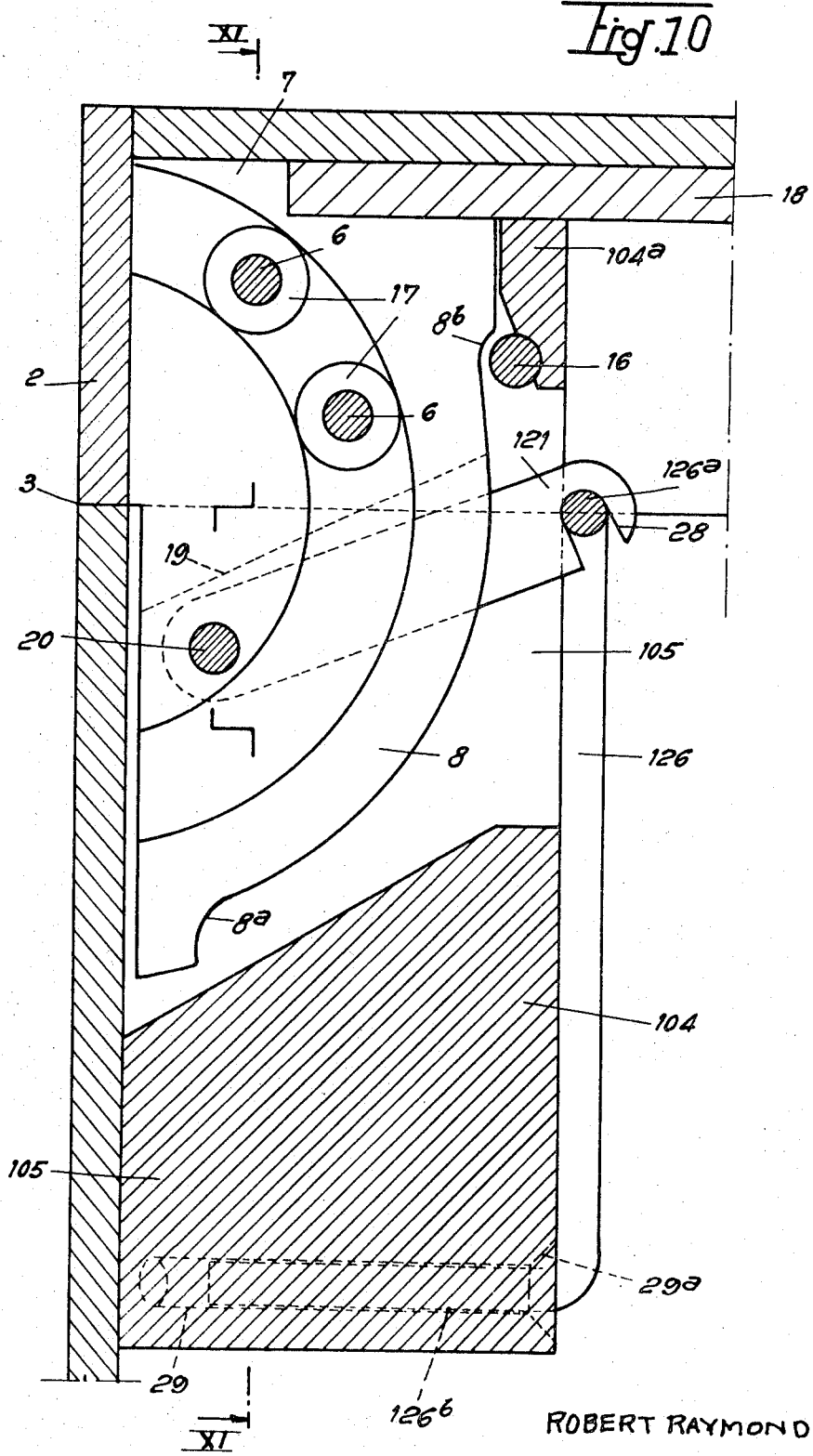

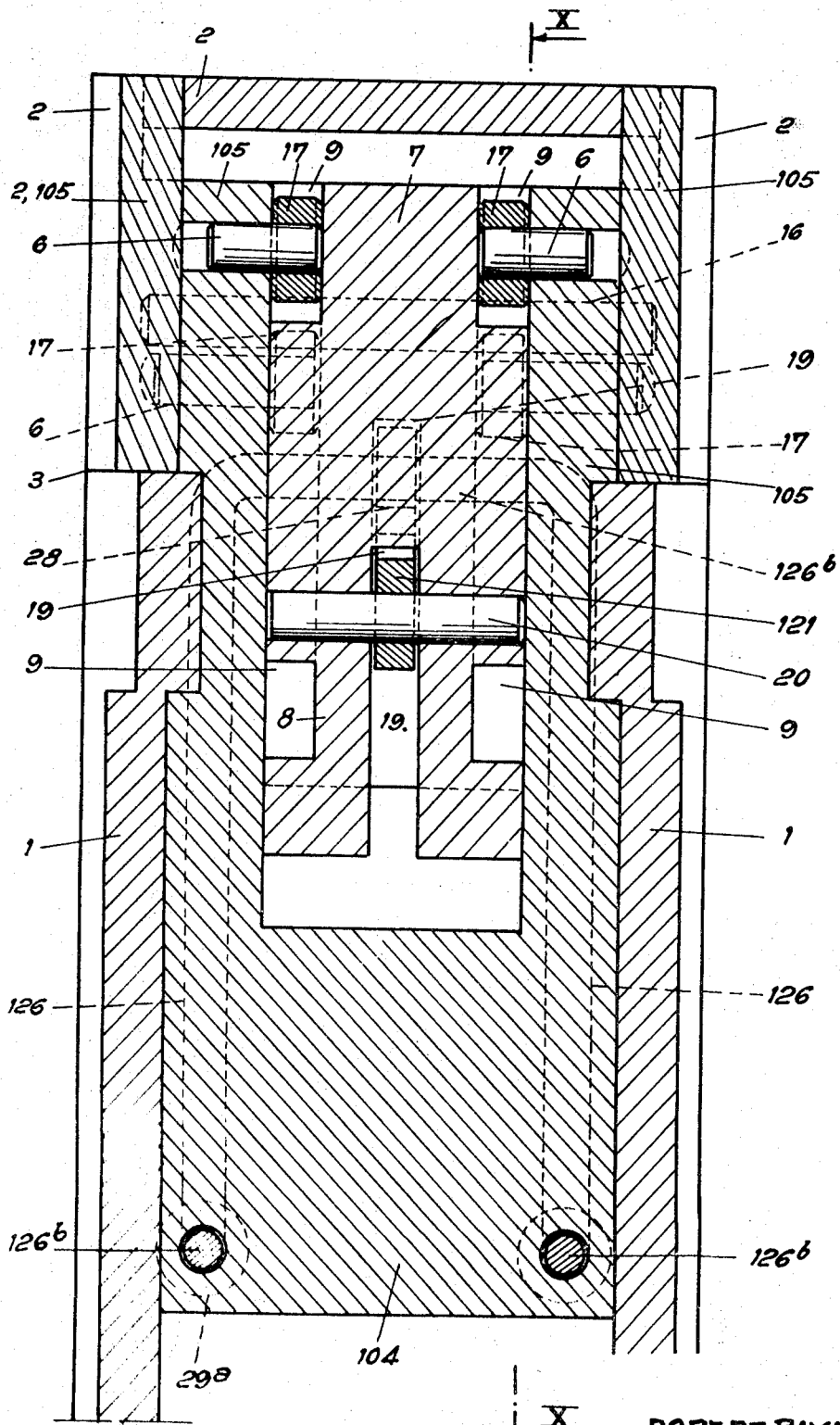

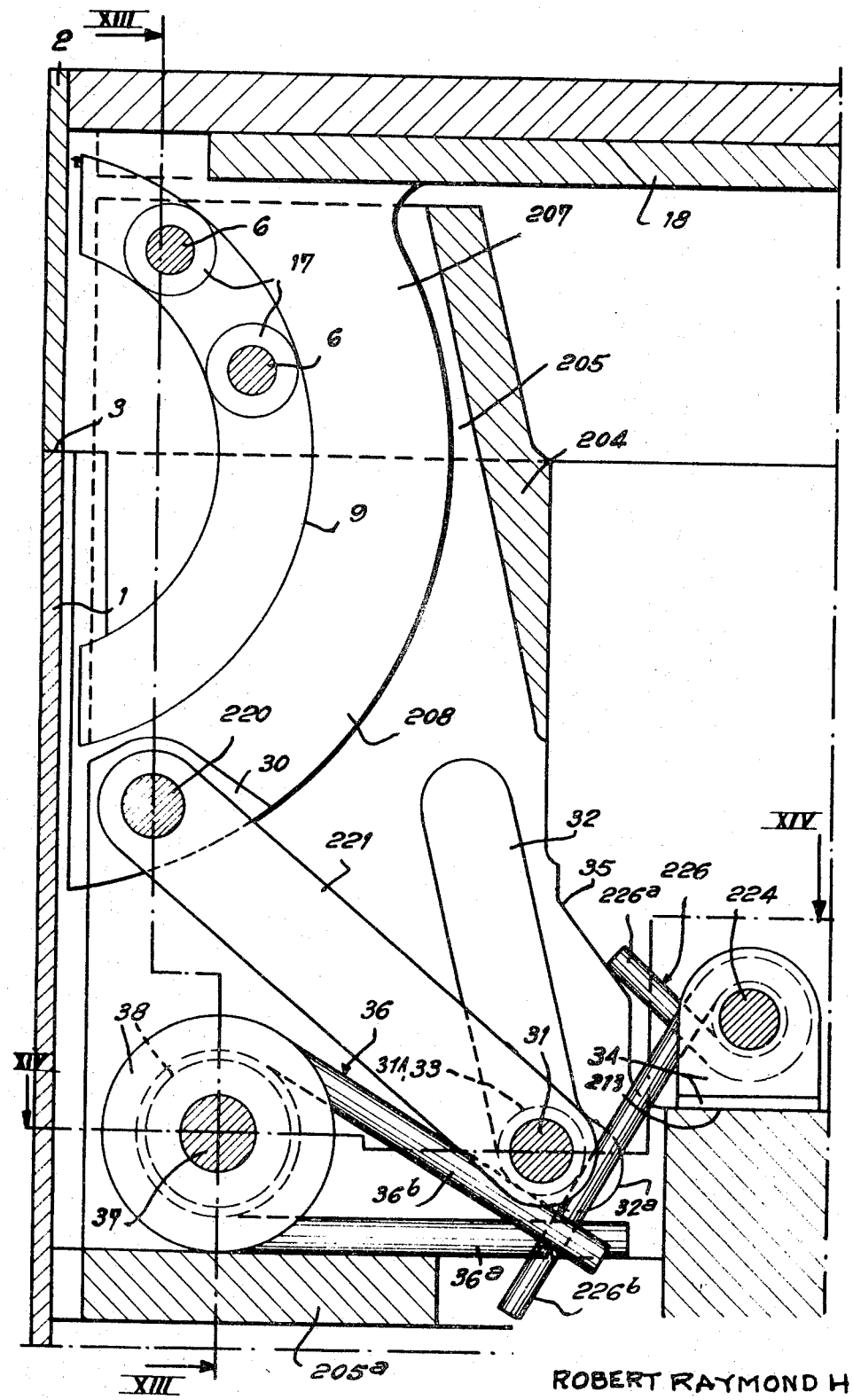

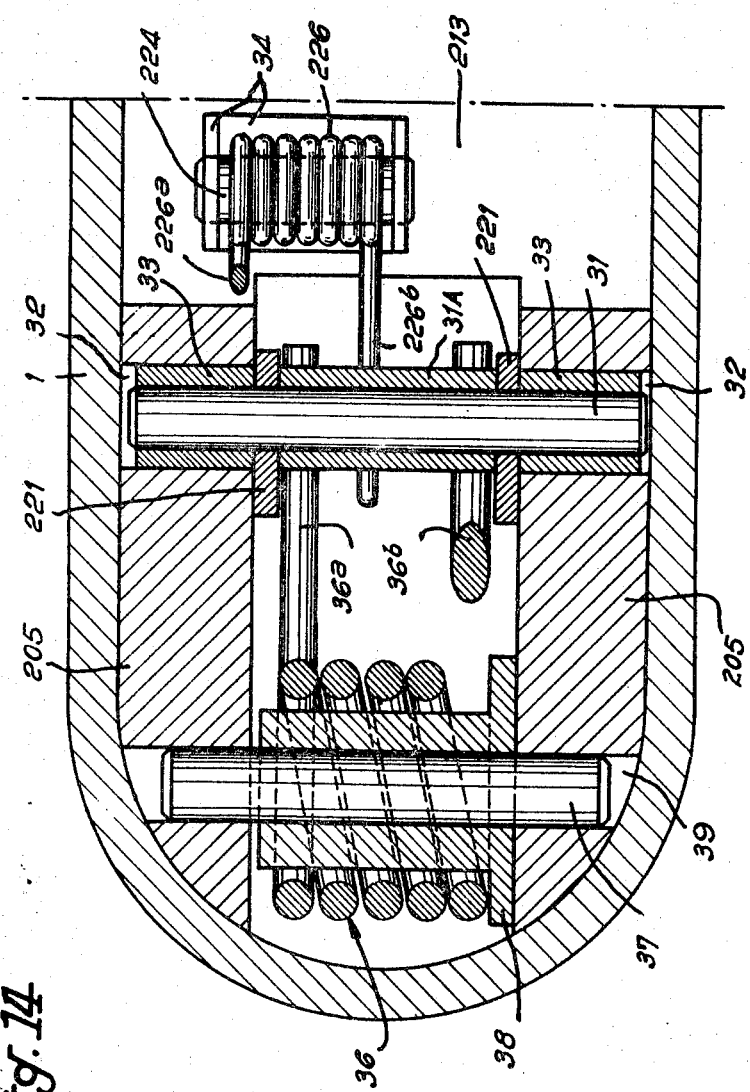

3,548,446
CONCEALED HINGES
Robert R. Hocq, Boulogne-Billancourt, France, assignor to Societe Franco-Hispano-Americaine Francispam, Paris, France, a corporation of France
Filed Feb. 20, 1968, Ser. No. 706,824
Int. Cl. E05d 3/06
U.S. Cl. 16—164    6 Claims

ABSTRACT OF THE DISCLOSURE

A concealed hinge for a container such as a box or case, particularly for a small case such as that of a cigarette lighter, the hinge having two main component parts, one provided with arcuate grooves which each cooperate with rollers in the other component part. A spring coupling may be provided to hold the hinge stable in the fully open and fully closed positions.

---

The present invention relates to concealed hinges of the type used for mounting a cover member to pivot on a container member without being visible when the container is closed. Such hinges can be used for mounting a lid or cap on a box or case, and are particularly suitable for attaching the cap to the case of a cigarette lighter, for example.

Such concealed hinges generally comprise one component member in the form of a guide block that is carried by or forms part of the cover (or the container) and is hollowed out externally to form two curved grooves each constituted by two concentric circular arcs whose centre is on an external joint line between the cover (cap, lid, etc.) and the body of the container (box, case, etc.) in each of which grooves there can move one of an associated pair of guide elements that form part of the other component part of the hinge and are carried by the container (or the cover).

A hinge of this general kind, for use with a door or to a window, is described in the United Kingdom specification No. 241,845. In this known embodiment, the two component parts of the hinge are in the form of plates, the one used for attachment to the door or window frame carrying a horizontally disposed male member in the two parallel faces of which arcuate grooves subtending 90° at the pivoting axis are produced, whilst the other component part has a fixing plate carrying a horizontal fork, the arms of which exhibit semicircular projections designed to cooperate with the aforesaid grooves in the male member. The hinge is concealed by virtue of the fact that the framework to which the plate carrying the female part is attached is recessed to receive the female and male assemblies when the two plates are applied together.

Such a hinge construction is not a practical one to apply to a case or box, particularly to a small container such as a lighter-case. A door or window is normally required to remain in any position to which it happens to be set when it is open, but for a container this is not so, as the cover, lid or cap is not required to remain stationary in any intermediate position, but only to occupy one of its two stable terminal positions, i.e., either fully open or closed. Furthermore, as the aforesaid Patent Specification states, it is easy to provide greasing holes for a window or door hinge, but this is not so with smaller hinges for use in containers such as the case of a lighter, where the dimensions are much smaller, and the device must not dirty the hands of the user. Therefore, in practice it is out of the question to contemplate in this context a sliding pair consisting of a quarter-circle groove and a semicircular bead, i.e., a double length arrangement, because the friction would be prohibitive.

One object of the present invention is to provide an improved concealed hinge of the general kind aforementioned, but applicable broadly to a container such as a box or case, and more particularly to the case and cap of a cigarette lighter.

The invention consists in a concealed hinge for mounting a cover member to pivot on a container member about an axis at or outside an edge of the joint between the two members, wherein one component part of said hinge comprises a guide block having two opposite faces perpendicular to the pivoting axis, each of said faces having a groove whose edges define concentric arcs about said axis, each one of said grooves cooperating with at least two of a plurality of rollers forming at least part of the other component part of said hinge.

Advantageously, a spring coupling may be provided, preferably comprising at least one link pivotally attached to the guide block and a spring device connected to the link and anchored at a fixed point on the box or the like, in such a manner that the lid or cap, when manually displaced, moves under the action of the said spring from one stable limit position to another, i.e., from the fully open position to the fully closed position and vice-versa.

In accordance with an advantageous feature of the present invention, the link is articulated at that of its ends not fixed to the guide block, to a second link, which is not straight and which itself is pivotally connected to a point on the other component part of the hinge, around which pivot point there is wound a spiral spring, the central part of which bears against said second link, and whose curved extremities react against a suitable surface on said other component part. Preferably, the other component part comprises a U-section component considered in a plane parallel to the joint line between lid and box, and the two arms of this U-section will carry the pivot pin for the second link, whilst the base of the U will serve as the abutment surface for the aforesaid extremities of the spiral spring.

In another embodiment, the link is articulated, at that of its ends not fixed to the guide block, to the centre of a U-shaped spring whose ends are curved at right-angles to the plane of the U and anchored in suitable seatings in said other component part.

In a third embodiment, those sides of the guide block which are embraced by cheeks of a U-section component forming part of said other component of said hinge will carry two in-line studs each acting as a pivot pin for one end of two respective parallel links whose other ends are connected by a crosspiece whose own ends slide preferably through the medium of rollers, in guides formed in the cheeks of the U-section component, and the spring is a spiral spring wrapped around a spindle integral with the said U-section component, and situated at a lower level than the level of the pivots carrying the links, one end of the said spring being anchored to the U-section component and its other end bearing against the link crosspiece when the cap or lid is in the closed position, and also during part at least of the opening and closing movement of the mechanism.

Preferably, in this embodiment a second spring will cooperate with the first and will be wrapped around a second spindle mounted in the U-shaped component below the level of the pivots carrying the links, this enabling the dimensions of the first spring to be reduced, and consequently also the space it requires, and being further more a desirable artifice in certain situations. One end of the second spring bears agaitns the said crosspiece and its other end is anchored to the fixed block.

The invention will now be described with reference to the drawings, which schematically illustrate by way of

3 example, several embodiments of a hinge in accordance with the present invention, as applied to a cigarette lighter:

FIG. 1 is a front elevation of the lighter with its cap closed;

FIG. 2 is a side elevation of the lighter shown in FIG. 1;

FIG. 3 is a top view of the closed lighter;

FIG. 4 is a partial perspective view of the open lighter;

FIG. 5 is an enlarged vertical section of the first embodiment of the hinge, taken on the line V—V of FIG. 6;

FIG. 6 is a vertical section on the line VI—VI of FIG. 5;

FIG. 7 is a horizontal section of the line VII—VII of FIG. 5;

FIG. 8 is a section similar to that of FIG. 5, but showing the cap or lid at the half-open position;

FIG. 9 is a section similar to that of FIG. 5, showing the cap or lid fully open;

FIG. 10 is an enlarged vertical section generally similar to FIG. 5, but illustrating a second exemplary embodiment of the invention, and is taken on the line X—X of FIG. 11;

FIG. 11 is a vertical section taken on the line XI—XI of FIG. 10;

FIG. 12 is a vertical section of a third exemplary embodiment of the invention, taken on the line XII—XII of FIG. 13;

FIG. 14 is a horizontal section on the line XIV—XIV of FIG. 12.

Figure 13:
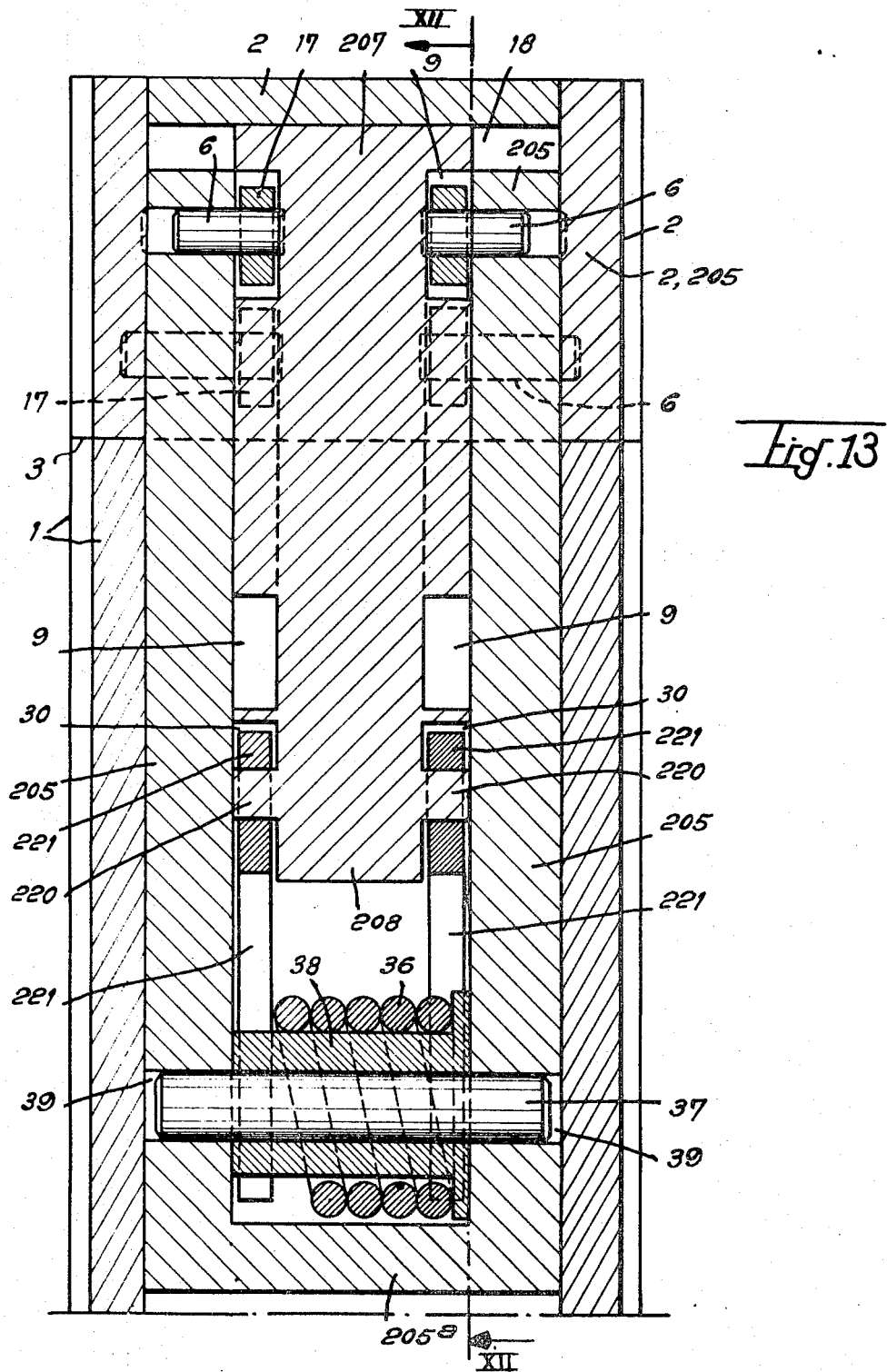
FIG. 13 is a vertical section on the line XIII—XIII of FIG. 12.

It will be seen from FIGS. 1 to 3, that the case, which can be made of any desired material and be provided with any desired kind of external decoration, has the external appearance of an elongated solid which we can treat as a rectangular parallelepiped extended at its smallest sides in the form of two semicylinders, although it should be clearly understood that this form could be quite different, for example completely circular, or with sharp angles throughout, and even, if required, of polygonal right section, the hinge then being mounted on one side of the polygon. The body 1 of the case (lighter, etc.) and its cover (lid, cap, etc.) 2 are only separated, as far as the eye can see, by a very thin, near-invisible line 3, this especially if, as in the case illustrated, the surface of the object is decorated, for example, in the form of vertical grooves.

FIG. 4 shows that in this embodiment the two component parts of the hinge are formed by two blocks of U-section, i.e., they each have the form of forks or yokes with two parallel arms. One of these blocks 4 is fixed and mounted in the body 1 of the lighter in any suitable manner, in order to project virtually up to the internal face of the cap base. Each of the arms 5 of the block 4 contain two spindles 6 carrying rollers. The second block 7 is a mobile guide block and is attached to the cap 2. Its arms 8 are each externally hollowed out to form a curved groove 9 co-operating with the rollers.

Finally, since the present example is that of a cigarette lighter, FIG. 4 also shows a thumb-wheel 10 which operates a flint-wheel through a mechanism which is not shown, since it does not form part of the present invention, and can take any appropriate design, in order to strike sparks and ignite the fuel exiting at the point 11 from a burner 12 (in the case that the lighter is one using liquid gas), or the fuel-soaked wick of the petrol lighter. In the case of a gas-lighter, the thumb-wheel 10 will also preferably control the valve which releases the gas.

The lighter mechanism will advantageously be carried by a plate 13 (FIGS. 5 and 7) which can be integral with the block 4. The bottom edge of the cap 2 is recessed internally at the point 14 to accommodate the thumb-wheel 10, in such a way that the latter is invisible when the cap is closed. The cap will also advantageously contain an extinguisher 15 which, in the case of a gas-

4 lighter for example, can hold the gas-release valve on its seat against the action of a spring (not shown) when the cap is closed, so that once the cap has been snapped open, it is merely necessary to thumb the wheel 10 in order to operate the flint-wheel and ignite the gas, the valve having been released and opened at the instant the extinguisher was disengaged from it.

Finally, the block 4 also carries a spindle 16 which acts as a stop in order to limit the opening movement of the cap 2, as will be described hereinafter.

FIGS. 5 to 9 show the constructional details of this first exemplary embodiment of a hinge in accordance with the present invention.

The spindles 6 each carry a roller 17 which rolls in a groove 9. The edges of each groove 9 are constituted by two concentric arcs of a circle, the centre of which is located on the external joint line 3 between the cap and the case. The length of the circular arcs is slightly less than 180°, the difference being substantially given by the common thickness of case and cap. The diameters of the rollers 17 are calculated in such a way that they can roll in the grooves 9, in order to guide the pivoting movement of the cap.

The cap will preferably be provided internally, over a part at least of its surface, with a reinforcing element 18. In the sapce 19 formed between the arms 8 of the guide block, there is pivotally mounted at the point 20 one end of a first link 21 whose other end is pivotally attached at the point 22 to one end of a second or intermediate link 23. The said second link is cranked or curved in the manner shown in FIG. 5, and is pivotally attached at its other end, at point 24, to a spindle mounted in the arms 5. Sleeves 25 surround the spindle 24 at either side of the second link 23, and around these sleeves there is coiled a spring 26 which is folded back on itself halfway along its length, at 26a, in order to bear against the second link 23, the free ends 26b of this spring being slightly curved and bearing against the internal wall 27 of the base of the yoke 4. FIGS. 5 and 6 also show the spindle 16 mounted in the arms 5.

FIGS. 8 and 9 illustrate the stages in the opening of the cap. There figures are very similar to FIG. 5; however, it has been assumed that in the design illustrated, the base of the yoke 4 forming the fixed block is interrupted over part of the height of the block, so that all that is left of the top of the block is the crosspiece or web 4a.

The pivoting movement of the cap 2 moves the guide block 7 with its arms 8. The link 21 pivots in the clockwise direction into a position shown in FIG. 8. The second link 23 pivots in the same direction, compressing the spring 26, the centre portion 26a of which moves into a plane vertically tangential to hms ends 26b which are parallel to the wall 27. This position constitutes a "dead-centre point" beyond which the force of the spring 26 will snap the mechanism smartly back into the position of maximum opening of the cap, as shown in FIG. 9. In this position, an appropriate profiled portion 8a of the lower part of each arm 8 comes into contact with the spindle 16.

A second exemplary embodiment is shown in FIGS. 10 and 11, with those components which are identical to those illustrated earlier identified by the references previously used, and modified components identified by the appropriate references added to 100.

We will confine ourselves hereinafter to a description of those parts of the mechanism which have undergone modification. The principal distinctions from the earlier design reside in the discarding of the second link and in the modification of the spring. The single link 121 is pivotally attached at the point 20 to the arms 8 of the guide block 7, but it is provided laterally towards its other end with a slot 27 in which there is lodged a loop portion 126a of a certain length, formed at the centre of a spring 126. This spring therefore, viewed from inside the lighter (FIG. 11), has an inverted U-shape with a base 126a and two arms 126; each arm is subsequently folded at right-angles at 126b towards the exterior and in a plane parallel to the central vertical plane of the lighter 1, each extremity 126b being seated in a blind bore 29 formed in an arm 105 and counter-bored in taper form at the entry end 29a, in order to facilitate the introduction of each arm 126b and to permit the arms 126 to bear properly with the cap when in the totally open position, and also, when in the totally closed position, against the adjacent face (that is to say, the face which is exposed to the interior of the lighter) of the bottom part of the base component 104.

In the rest state, the spring 126 bears against the face of the block 104. If the cap is opened, the pivoting movement of the buide block 7 via its arms 8, forces the link 121 inwards into the lighter case, extending the spring 126 and moving it away from its rest position. On passing the "dead-centre point" constituted by the position of maximum extension of the link 121 towards the interior of the case, the spring 126 snaps the link into its opposite rest position, in which the spring once again comes to rest against the face of the block 104.

As before, the surface 8a of each arm 8 comes into contact with the spindle 16 when the cap is in the fully open position, and the surface 8b does the same when it is in the fully closed position.

FIGS. 12 to 14 illustrate a third exemplary embodiment, with those components which are identical to those referred to hereinbefore identified by the references previously used, whilst components which have been modified carry the appropriate references added to 200.

We will confine ourselves in the following to a description of those parts of the mechanism which have been modified. The principal differences reside in the replacing of the single link 21 or 121, by two parallel links 221, and in a new arrangement of the spring. The links 121 are pivotally attached to the bottom end 208 of the mobile guide block 207 (which this time does not have two parallel arms), by means of two alinged studs 220 integral with the block or fixed to it. As FIG. 12 and 13 show, the links 221 are seated in appropriate recesses 30 in the bottom part 208 of the mobile guide block. The links 221 have their other ends connected together through a crosspiece 31, the ends of which crosspiece slide in guides 32 formed in each inner face of the arms 205 of the fixed block 104, the sliding movement preferably being through the medium of roller 33. A spring 226 is coiled about a spindle 224 carried in this example by a yoke 34 suitably attached to a surface 213 which carries the lighter mechanism in the same way as the surface 13 of FIGS. 5 and 7 to 9. One end 226a of the spring 226 bears against an appropriate surface 35 (FIG. 12) of one of the arms 205, whilst the other end 226b is in contact with the crosspiece 31 in the closed position and during at least part of the opening and closing movement of the cap 2, that is to say between the closed position and a position which corresponds to full extension of the spring 226. Preferably, the contact of the spring is achieved by means of a collar 31a which surrounds the central part of the crosspiece 31 between the links 221.

This design operates perfectly provided that the spring 226 is sufficiently long and sufficiently strong to follow the links 221 up to the fully open position of the cap. If the dimensions of the case 1 are quite small, it may be difficult to accommodate a single, sufficiently strong spring. In this case, it may be preferable to assist the action of the relatively weak spring 226, weak because of its small size, by using a second spring which simply serves to effect full opening of the cap. This auxiliary spring is placed beneath the pivots 220. In the exampe illustrated in FIGS. 12 to 14, this second spring 36 is coiled around a spindle 37 itself surrounded by a sleeve 38 and mounted in locations 39 in the arms 205 (FIG. 13 and 14). One end 36a of this spring is anchored to the fixed block component of the hinge in some suitable manner, for example simply by making it bear against a horizontal surface 205a on one of the arms 205. The other end 36b of the spring 36 bears against the collar 31a on the crosspiece 31, and tends to pivot the cap 2 into its fully open position as soon as the user, by starting to lift the cap 2, moves the links 221 in the guides 32 in the direction towards that end 32a (FIG. 12) of each guide 32 which corresponds to the dead-centre point of the mechanism (the full extension of the links) upon which the end 36b of the spring moves, along with the crosspiece 31, until the cap is in the fully open position. It will be noted that the extremity 32 a of the guides is preferably slightly offset in relation to the rest of the guide length, so that in the fully closed position of the cap by the force exerted by the spring 36 is counterbalanced by the form of the guides.

Operation of the hinge will be clearly apparent from the ensuing description:

When the user lifts the cap 2, he causes the links 221 to pivot in anticlockwise direction into a position of maximum extension corresponding to the aforesaid dead-centre point, i.e., the base of the guides 32. At this moment, the spring 226 forces the crosspiece 31 upwards into the fully open position. This opening movement is advantageously limited, in the absence of the spindle 16 of FIGS. 4 to 6 and 8 to 11, by the top end of the guides 32. The spring 36, if included, also contributes to the lifting of the crosspiece 31, and it accompanies the latter throughout its full travel, possibly assisting the action of the spring 226 if the latter is too weak on its own.

On closure of the cap 2, the springs 226 and 36 are loaded and, as soon as the dead-centre point is passed, the spring 226 forces the crosspiece 31 and therefore the links 221, through its full travel up to the terminal position (complete closure of the cap).

It should be clearly understood that the embodiments described and illustrated here have been given simply by way of example, and are open to a wide range of modifications without departing from the scope of the present invention. In particular, if the invention is applied to a wide parallelepiped case of generally known form, then generally at least two hinges of this type will be provided at suitable locations on one side of the box, and the fixed block will, if required, be concealed by a suitable embellisher which simply provides passage for the guide block in the open position of the lid.

What I claim as my invention and desire to secure by Letters Patent of the United States is:

1. In a concealed hinge for mounting a cover member on a container member about an axis at or outside an edge of the joint between the two members, in combination:

(a) a moving U-shaped guide block secured to the cover member and having two opposite faces perpendicular to the pivoting axis, each of said faces a groove whose edges define concentric arcs about the said pivoting axis, (b) a fixed U-shaped guide block secured to the container member, having two opposite faces perpendicular to the said pivoting axis and respectively parallel to the said opposite faces of the said movable guide block, (c) two separate pairs of rollers, one of said pairs cooperating with each of the said grooves of the said movable guide block the individual rollers of each said pair being mounted upon a spindle that is coaxial with a roller of the other said pair, the spindles of one pair being secured to one of said faces of the said fixed guide block, while the spindles of the other pair are secured to the other of said faces of the said fixed guide block, and (d) at least one link pivotally mounted in the said movable guide block and a spring means engaging the said link and fixedly anchored to the said guide block.

2. A concealed hinge as lcaimed in claim 1, wherein that end of said link that is remote from said movable guide block is articulatingly connected to one end of a nonlinear inermediate link whose other end is pivotally attached to said fixed guide block by a pivot about which a spiral spring is coiled in such a manner that the central part of said spiral spring bears against said intermediate link and the ends of said spiral spring are curved to bear against a surface of said fixed guide block.

3. A concealed hinge as claimed in claim 1 wherein said fixed guide block is U-shaped in a plane parallel to the pivoting axis of said hinge, the two arms of this U-section carrying the pivot for said intermediate link, and the base of the U-section serving to support said curved ends of said spiral spring.

4. A concealed hinge as claimed in claim 1, wherein that end of said link that is remote from said movable guide block is articulatingly connected to the centre of a U-shaped spring whose ends are bent at right-angles to the plane of the U and anchored in said fixed guide block.

5. A concealed hinge as claimed in claim 1, wherein said fixed guide block consists of a U-shaped member whose arms embrace said movable guide block, and said movable guide block is provided with two opposed coavial studs between the arms of said U-shaped member of said fixed guide block, said studs serving as pivots for the associated ends of two links which extend mutually parallel and are joined at their free ends by a crosspiece whose ends move in guides formed in the inner faces of the arms of said U-shaped member, and a spiral spring is coiled about a spindle on said fixed guide block below the level of the link pivots, one end of the said spring being anchored to said U-shaped member and its other end bearing against said crosspiece in the closed position of said hinge and also during at least a part of the opening and closing movement of said hinge.

6. A concealed hinge as claimed in claim 5, wherein a second spiral spring is provided, which cooperates with the first spiral spring and is coiled about a spindle mounted in said U-shaped member of said fixed guide block below the level of the link pivots, one end of said second spring bearing against said crosspiece and its other end being anchored in said U-shaped member.

References Cited
UNITED STATES PATENTS

| | | | |
|---|---|---|---|
| 2,039,130 | 4/1936 | Van Note | 16—164 |
| 2,137,751 | 11/1938 | Davis | 16—164 |
| 2,133,554 | 10/1938 | Ludwig | 16—164X |
| 2,149,973 | 3/1939 | Ludwig | 16—164 |
| 2,200,511 | 5/1940 | Ludwig | 16—164 |
| 2,298,767 | 10/1942 | Johnson. | |

BOBBY R. GAY, Primary Examiner

U.S. Cl. X.R.

220—35